United States Patent [19]

O'Connor et al.

[11] Patent Number: 4,590,255

[45] Date of Patent: * May 20, 1986

[54] PREPARATION OF IONOMERS AND POLYURETHANE ELASTOMERS FROM CARBOXYLIC ACID-CONTAINING MONOETHER AND POLYETHER POLYOL ADDITION PRODUCTS

[75] Inventors: James M. O'Connor, Clinton; Richard L. Frentzel, Guilford, both of Conn.

[73] Assignee: Olin Corporation, Cheshire, Conn.

[*] Notice: The portion of the term of this patent subsequent to Jun. 4, 2002 has been disclaimed.

[21] Appl. No.: 575,087

[22] Filed: Jan. 30, 1984

Related U.S. Application Data

[63] Continuation-in-part of Ser. No. 475,785, Mar. 16, 1983, Pat. No. 4,521,615.

[51] Int. Cl.[4] .................... C08G 18/46; C08G 18/50; C07C 67/08; C07F 3/10; C07F 15/00
[52] U.S. Cl. ......................................... 528/71; 528/50; 528/75; 528/81; 528/83; 556/114; 556/131; 556/136; 556/147; 560/198
[58] Field of Search .................... 560/198; 528/80, 81, 528/83, 75, 71, 50; 260/429 R, 429.9, 430, 431, 438.1, 439 R; 556/114, 131, 136, 147

[56] References Cited

U.S. PATENT DOCUMENTS

| | | | |
|---|---|---|---|
| 3,419,510 | 12/1968 | Hudak | 260/18 |
| 3,983,058 | 9/1976 | Hirooka et al. | 260/29 |
| 4,124,552 | 11/1978 | Koleske et al. | 260/29 |
| 4,207,227 | 6/1980 | von Bonin | 260/40 |
| 4,250,077 | 2/1981 | von Bonin et al. | 260/37 |
| 4,263,413 | 4/1981 | Gardner et al. | 525/34 |
| 4,365,024 | 12/1982 | Frentzel | 521/114 |
| 4,521,615 | 6/1985 | Frentzel | 560/198 |

OTHER PUBLICATIONS

D. Dieterich; *Polyurethane Ionomers, a New Class of Block Polymers*, Angew. Chem. Internat. Edit., vol. 9 (1970), No. 1, pp. 40–50.

V. Malatesta and J. C. Scaiano, "*Absolute Rate Constants for the Reactions of tert-Butoxyl with Ethers: Importance of the Stereoelectronic Effect*", J. Org. Chem., 1982, 47, pp. 1455–1459.

*Primary Examiner*—Natalie Trousof
*Assistant Examiner*—Vera C. Clarke
*Attorney, Agent, or Firm*—William A. Simons; Thomas P. O'Day

[57] ABSTRACT

A process for making metal salt (ionomers) of carboxylic acid-containing mono- and polyether polyol addition products by (1) reacting maleic acid, fumaric acid, itaconic acid, or mixtures thereof with at least one polyhydroxy-containing mono- or polyether compound (e.g. a polyether diol or triol) in the presence of a peroxy-type free radical initiator to form a carboxylic acid group-containing addition product and (2) neutralizing said addition product with a sufficient amount of metal ions selected from the group consisting of metals from Groups 1a, 2a, 8, 1b and 2b of the Periodic Table to convert at least about 10% of the carboxylic acid groups to ionomeric salt groups. These ionomers may be then changed into useful polyurethane elastomers by reaction with organic polyisocyanates.

14 Claims, No Drawings

4,590,255

PREPARATION OF IONOMERS AND POLYURETHANE ELASTOMERS FROM CARBOXYLIC ACID-CONTAINING MONOETHER AND POLYETHER POLYOL ADDITION PRODUCTS

CROSS-REFERENCE TO RELATED APPLICATIONS

This application is a continuation-in-part application of U.S. patent application No. 475,785, which was filed on Mar. 16, 1983 now U.S. Pat. No. 4,521,615.

BACKGROUND OF THE INVENTION

1. Field Of The Invention

The present invention relates to a process for making metal salts (ionomers) from selected carboxylic acid-containing monoether and polyether polyol addition products. The present invention also relates to these ionomers as compositions-of-matter. The present invention further relates to polyurethane elastomers made from these ionomers along with the process for making these latter products.

2. Description of the Prior Art

Reactions of carboxylic acids with polyols are well known. The best known reaction between these compounds is the formation of polyester polyols wherein the acid groups react with the OH groups in the polyol.

Other reactions have also been taught. U.S. Pat. No. 4,250,077 (von Bonin et al.) teaches mixing olefinically unsaturated carboxylic acids with many types of polyols and then polymerizing the mixture with a free-radical former to produce a graft polymer. The preferred carboxylic acid (and the only acid used in the working examples) is acrylic acid, which homopolymerizes with itself. It should be noted that this reference does not teach the exact mechanism by which the "polymerization" reaction is carried out.

U.S. Pat. No. 4,365,024 (Frentzel) teaches making surfactants suitable for incorporation in polyurethane foams by reacting under free radical polymerization conditions a polyoxyalkylene adduct and an esterified unsaturated dibasic acid containing 4 or 5 carbon atoms. The mechanism of this reaction is referred to as grafting, i.e. the reaction product is composed of the polyoxyalkylene adduct backbone to which are attached at intervals "grafts" of the unsaturated diester. See column 4, lines 46–51 of this patent. The patent further states that "In light of the known inability of unsaturated diesters of the invention to homopolymerize, it is believed that the mechanism of the reaction may involve the addition of single diester units to the polyoxyalkylene backbone" The patent specifically teaches that these surfactants may be used in phenolic resin foams, polyisocyanurate foams and polyurethane foams.

U.S. patent application Ser. Nos. 475,785 (Frentzel) and 475,786 (Frentzel et al.), both filed on Mar. 16, 1983, teach making carboxylic acid-containing mono- and polyether polyol addition products by reacting maleic acid, fumaric acid, or mixtures thereof with at least one polyhydroxy-containing mono- or polyether compound (e.g. a polyether diol or triol) in the presence of a peroxy free radical initiator. These patent applications also disclose making polyurethane prepolymers and aqueous polyurethane dispersions from these carboxylic acid-containing mono- and polyether polyol addition products.

It has now been found that these selected carboxylic acid-containing mono- and polyether addition products are particularly advantageous for making ionomers and polyurethane elastomers. The single acid units on the backbone provide adequate sites for reaction with metal ions to make ionomers, which in turn may be changed into polyurethane elastomers.

BRIEF SUMMARY OF THE INVENTION

Accordingly, the present invention is directed to a process for making a metal salt (ionomer) of carboxylic acid-containing mono- or polyether polyol addition products comprising:

(a) reacting an ethylenically unsaturated dicarboxylic acid selected from the group consisting of maleic acid, fumaric acid, and mixtures thereof with at least one polyhydroxy-containing mono- or polyether compound in the presence of a peroxy-type free radical catalyst; said weight ratio of said polyhydroxy-containing mono- or polyether compound to said acid being from about 99:1 to about 70:30;

(b) neutralizing the formed addition product with a sufficient amount of metal ions selected from the group of mono-, di- or trivalent metal ions of Groups 1a, 2a, 8, 1b and 2b of the Periodic Table to convert at least about 10% of the carboxylic acid groups in said addition product to salt groups.

These ionomeric compounds may be employed in making polyurethane elastomers by the additional step which comprises:

(c) reacting at least one of these metal salts of carboxylic acid-containing monoether or polyether polyol addition products with an organic polyisocyanate to form a carboxylic acid salt-containing polyurethane elastomer.

Furthermore, these polyurethane elastomers may be used as plastic articles and other useful products.

Still further, the present invention is directed to the above-noted metal salts of these carboxylic acid-containing monoether and polyether polyols and the resulting polyurethane elastomers as novel compositions-of-matter.

DETAILED DESCRIPTION

1. Preparation of Carboxylic Acid-Containing Polyether Polyol Addition Products While the present invention is not to be so limited, this free radical initiated addition reaction is believed to occur by a three-step mechanism, which is illustrated by the following Equations (I) through (X) wherein the monoether polyol or polyether polyol employed is represented by A; one of the selected acids is represented by B; and the peroxy-type free radical initiator is represented by ROOR:

Initiation:

$$ROOR \rightarrow 2RO\bullet \qquad (I)$$

Propagation:

$$A + RO\bullet \rightarrow A\bullet + ROH \qquad (II)$$

$$A\bullet + B \rightarrow A-B\bullet \qquad (III)$$

$$A-B\bullet + A \rightarrow A-B + A\bullet \qquad (IV)$$

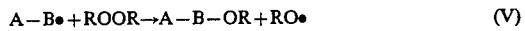

$$A-B\bullet + ROOR \rightarrow A-B-OR + RO\bullet \qquad (V)$$

$$A-B\bullet + ROH \rightarrow A-B + RO\bullet \qquad (VI)$$

Termination:

$$2RO\bullet \rightarrow ROOR \quad (VII)$$

$$A\bullet + A\bullet \rightarrow A-A \quad (VIII)$$

$$AB\bullet + A\bullet \rightarrow A-B-A \quad (IX)$$

$$AB\bullet + AB\bullet \rightarrow ABBA \quad (X)$$

In the case where tripropyleneglycol (TPG) is the polyether ployol (A) employed and either maleic acid [cis-HOOCCH=CHCOOH] or fumaric acid [trans-HOOCCH=CHCOOH] are employed as the acid (B), Equations (II), (III) and (IV) would be written respectively as the equations (IIa), (IIIa) and (IVa) as shown below:

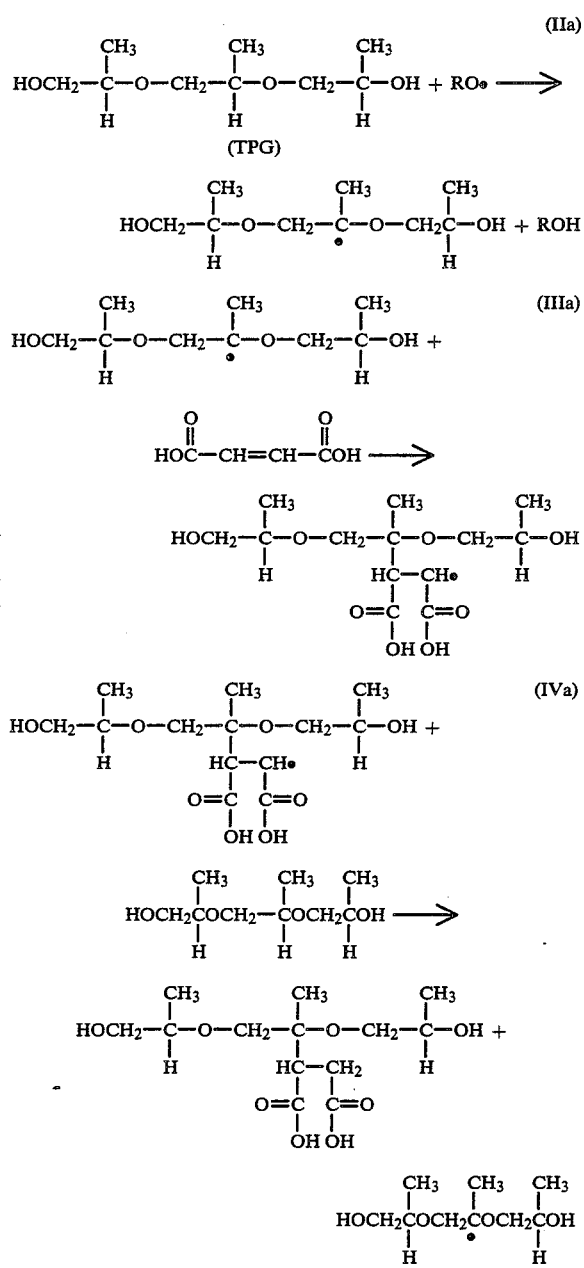

As can be seen in Equation (IIIa), above, the carboxylic acid replaces a hydrogen atom on a carbon adjacent to an oxygen atom in an ether linkage (C—O—C). With TPG as the polyether polyol, there are three other sites where it is believed the acid groups may replace a hydrogen. These are the other three carbons adjacent to an ether-oxygen atom. Thus, it is possible in theory that individual carboxylic acid groups may attach to all four sites on TPG. In practice, it is believed that steric effects will prevent the attachment of that many acid groups on such a short polyether polyol. On much longer polyether polyols, it may be possible that many carboxylic acid groups will become attached.

Maleic acid and fumaric acid are the only known ethylenically unsaturated diicarboxylic acids that could be used for this invention because they do not homopolymerize. Free radical addition reactions with them are completed by removal of a hydrogen from another polyol [see Equation (IV) above] or from another hydrogen atom source.

Suitable polyhydroxy-containing monoether and polyether compounds for the present invention include any compound which contains 2 or more hydroxyl groups and contains 1 or more ether linkages (C—O—C) and having a molecular weight from 106 to about 20,000. The compounds are commonly called either monoether polyols or polyether polyols. The two or more hydroxyl groups are needed for reaction with polyisocyanates to form polyurethane prepolymers. The ether linkage is needed for the formation of a free radical on an adjacent carbon. See V. Malatesta and J. C. Scaiano, "Absolute Rate Constants for the Reactions of tert-Butoxyl with Ethers: Importance of the Stereoelectronic Effect" *J. Org. Chem.*, 1982, 47, pages 1455-1459. Polyester polyols and other types of polyols which do not contain ether linkages could not be used for this reaction; but could be employed as supplemental polyols for reaction with polyisocyanates and the like.

In particular, suitable monoether polyols include diethylene glycol and dipropylene glycol. Because of their relatively short length, monoether polyols are usually not used alone, but used in combination with polyether polyols.

Suitable polyether polyols include various polyoxyalkylene polyols having from 2 to 8 hydroxyl groups and mixtures thereof. These can be prepared, according to well-known methods, by condensing an alkylene oxide, or a mixture of alkylene oxides using random or step-wise addition, with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide, tetrahydrofuran, epichlorohydrin and the like. The most preferred alkylene oxides are ethylene oxide, propylene oxide or a mixture of these two oxides using random or step-wise oxyalkylation.

The polyhydric initiator used in preparing the polyether polyol reactant includes the following and mixtures thereof: (a) the aliphatic diols such as ethylene glycol, 1,3-propylene glycol, 1,2-propylene glycol, butylene glycols, butane diols, pentane diols, and the like; (b) the aliphatic triols such as glycerol, trimethylolpropane, triethylolpropane, trimethylolhexane, and the like; (c) higher functionality alcohols such as sorbitol, pentaerythritol, methyl glucoside, and the like; (d) the polyamines such as tetraethylene diamine; and (e) the alkanolamines such as diethanolamine, triethanolamine, and the like.

A preferred group of polyhydric initiators for use in preparing the polyether polyol reactant is one which comprises aliphatic diols and triols such as ethylene glycol, propylene glycol, glycerol, trimethylolpropane, and the like.

The alkylene oxide-polyhydric initiator condensation reaction is preferably carried out in the presence of a catalyst such as KOH as is well known in the art. In effecting the reaction, a sufficient proportion of alkylene oxide is preferably used as to provide a final polyol product having an average molecular weight of about 200 to about 10,000, and more preferably about 300 to about 6,500. The catalyst is thereafter preferably removed, leaving a polyether polyol which is ready for use in preparing the hydroxyl-terminated prepolymer of the invention.

The preferred polyether polyols are derived from diols, triols, and mixtures thereof. The most preferred polyether polyols for the present invention are polyoxyethylene diols and triols, polyoxypropylene diols and triols, block and random polyoxyethylene-polyoxypropylene diols and triols and mixtures thereof, having a molecular weight from about 300 to about 6500.

It should be noted that the monoether and polyether polyol reactants of the present invention may be reacted with diacids or anhydrides to form polyester polyether polyols prior to the addition reaction (step (a) as noted above) of this invention. Thus, polyester polyether polyols would be formed having carboxylic acid groups individually spaced on the molecule.

Any peroxy-type free radical initiator may be employed for this reaction. Other types of initiators are not suitable for this reaction. Typical peroxy-type free radical initiators include hydrogen peroxide and organo peroxides and hydroperoxides such as dibenzolyl peroxide, acetly peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-alphacumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, alpha-methylbenzyl hydroperoxide, alpha-methyl-alpha-ethyl benzyl hydroperoxide, Tetralin hydroperoxide, triphenylmethyl hydroperoxide, diphenylmethyl hydroperoxide, 2,5-di-methyl-2,5-bis(2-ethyl hexanoyl peroxy)hexane, 1,1-bis(t-butyl-peroxy) cyclohexane and t-butyl perbenzoate.

As stated above, the weight ratio of the total monoether polyol(s) and polyether polyol(s) employed to the unsaturated dicarboxylic acid should be from about 99:1 to about 70:30. When less than about 1 part by weight of the acid is used per about 99 parts of the polyol, the character of the polyol is hardly changed and this reaction is meaningless for most applications. When more than about 30 parts by weight of the acid is employed per about 70 parts of the polyol, there is a good chance that a significant portion of the acid will not react onto the polyol because of absence of sufficient reactive sites. Preferably, this weight ratio is from about 95:5 to about 80:20.

Besides the selected reactants, peroxy-type initiators and weight ratios mentioned above, the other reaction conditions of this step are not critical to the present invention and the present process should not be limited to any particular conditions. It is preferred to carry out this reaction at a temperature from about 25° C. to about 150° C. More preferably, the reaction temperature may be in the range from about 80° C. to about 130° C. The reaction temperature should be high enough to activate the peroxy-type free radical initiator for this reaction. In some cases, it may be desirable to add a free radical accelerator such as a Redox catalyst to speed up the reaction. The reaction time will depend mainly upon the reaction temperature used and suitable reaction times will range from about 30 minutes to 600 minutes. The reaction may be monitored by following the disappearance of the maleic, fumaric or itaconic acid in the reaction mixture with conventional analysis techniques.

Generally, this reaction may be carried out without a solvent. However, in some cases, it may be desirable to employ a solvent. For example, if a very viscous polyether polyol is employed, it may be desirable to thin the reaction mixture with water or another solvent to facilitate the reaction.

Furthermore, super- or sub-atmospheric reaction pressure is not necessary for the present reaction. Atmospheric pressure is preferred in order to avoid the expense of special reaction vessels.

The free-radical initiated reaction of this invention may be conducted under conditions known to be suitable for free-radical polymerizations. The reaction is advantageously carried out by mixing the reactants, initiator(s), and optionally with a free-radical accelerator(s) and solvent, at temperatures from about 25° C. to about 150° C. with an inert atmosphere (e.g. under a nitrogen blanket) until the reaction is complete. The initiator(s) and optional accelerator(s) and solvent may be added at the beginning of the reaction or may be added portionwise at intervals during the course of reaction. Likewise, the unsaturated acid reactant(s) and the monoether polyol(s) or polyether polyol(s) reactants may be brought together at the beginning of the reaction or may be combined in increments as the reaction proceeds. The addition products produced by this reaction are generally water-insoluble.

2. Neutralization Of The Addition Product With Metal Ions To Form Metal Salts (Ionomers)

As stated above, the formed addition product is neutralized in accordance with this invention in order to convert at least about 10% of the carboxylic acid groups in the addition product into metal salt groups (e.g. $-COO^- Na^+$). The presence of these salt groups increases certain physical properties of polyurethane elastomers made therefrom such as hardness and tensile strength as well as the flex modulus of elasticity without significantly reducing elongation. Thus, the resulting polyurethane elastomer may be made to have desirable physical properties without the use of additional amounts of chain extenders and polyisocyanates.

The metal ions which are suitable in forming the ionomers of the present invention include the mono-, di- and trivalent ions of metals in Groups 1a, 2a, 8, 1b and 2b of the Periodic Table of Elements (see front inside cover, Handbook of Chemistry and Physics, Chemical Rubber Publishing Co., 63rd Ed.). Suitable monovalent metal ions are $Na^+$, $K^+$, $Li^+$, $Ag^+$, $Hg^+$, and $Cu^+$.

Suitable divalent metals ions are $Mg^{+2}$, $Ca^{+2}$, $Ba^{+2}$, $Cu^{+2}$, $Pd^{+2}$, $Pt^{+2}$, $Cd^{+2}$, $Hg^{+2}$, $Fe^{+2}$, $Co^{+2}$, $Ni^{+2}$, and $Zn^{+2}$. A suitable trivalent metal ion is $Fe^{+3}$. The preferred metal ions for commercial applications are those of the alkali metal and alkaline earth metals, especially $Na^+$, $K^+$, $Ca^{+2}$ and $Mg^{+2}$ because of their speed of reaction. Ionomers containing two or more metallic ions may also be used.

The metal ions may be formed by adding metal-containing compounds into an aqueous solution and allowing the metal cations to disassociate from the anions. Suitable anions include hydroxides, oxides, formates, acetates, nitrates, carbonates and bicarbonates. Other metal-containing compounds which show some degree of ionization in water may also be employed. Hydroxide and oxide anions are preferred because they form no impurities which require separation from the aqueous solution.

The amount of metal ions should be sufficient to convert at least about 10% by weight of the carboxylic acid groups to the metal salt. This is believed to be about the minimum amount of salt groups that is necessary in most applications to effect a significant change in the properties of the addition product. More preferable, it is generally desirable to convert at least a major portion (i.e. about 50% or more) of the carboxylic acid groups to metal salt groups. In certain applications, it may be more preferable to convert substantially all (i.e. more than 95%) of the carboxylic acid groups.

This neutralization step may be accomplished simply by adding the unneutralized addition product made in step (a) to an aqueous solution containing the desired dissociated metal-containing compound and allowing the neutralization to take place in-situ.

3. Preparation of Polyurethane Elastomers

The metal salts of carboxylic acid-containing monoether and polyether polyol addition products prepared above may be used to form polyurethane elastomers products. These elastomers may be made by reacting these metal salt compounds with at least one organic polyisocyanate under conventionally known reaction conditions.

Suitable organic polyisocyanates may be any aromatic, cycloaliphatic and aliphatic diisocyanates and higher polyisocyanates. Diisocyanates are the preferred class of polyisocyanates. Suitable aliphatic diisocyanates include hexamethylene diisocyanate; 4,4'-dicyclohexylmethane diisocyanate; 1,4-tetramethylene diisocyanate; and 1,10-decamethylene diisocyanate. Suitable aromatic diisocyanates include toluene-2,4- or 2,6-diisocyanate (the mixture or each is also known as TDI); 1,5-naphthalene diisocyanate; 4-methoxy-1,3-phenylene diisocyanate; 4-chloro-1,3-phenylene diisocyanate; 2,4-diisocyanatodiphenyl ether; 5,6-dimethyl-1,3-phenylene diisocyanate; 2,4-dimethyl-1,3-phenylene diisocyanate; 4,4-diisocyanatodiphenylether; benzidine diisocyanate; 4,4-diisocyanatodibenzyl; methylene-bis(4-phenyl-isocyanate) (also known as MDI); and 1,3-phenylene diisocyanate.

Besides the presence of these two reactants, the other reaction parameters for this polyurethane-forming step are not critical and the present invention should not be limited to any particular conditions for carrying out this step.

In certain applications, it is preferred to add one or more chain extenders. These include any compound having two active hydrogen-containing groups and a molecular weight between 18 and 200. Specific examples include diols, diamines, hydrazines, dihydrazides and the like. The preferred diol is ethylene glycol. Other suitable compounds include ethylene diamine, isophorone diamine, diethylene glycol, and 1,4-butanediol.

The rate of reaction between the ionomer(s) and the polyisocyanate(s) may be increased by the employment of conventially known polyurethane-forming catalysts. These include the tertiary amine catalysts and organometallic compounds such as organomercury and organotin compounds. However, the use of such catalysts is not critical to the present invention.

Furthermore, plasticizers, pigments and fillers such as carbon black, silica and clay may be incorporated into these urethanes.

The ratio of isocyanate (NCO) groups to hydroxy (OH) groups in the reactants is preferably in the range from about 0.9:1 to about 1.2:1; preferably, in the range from about 1:1 to 1.05:1.

The preferred reaction temperature for making the elastomer is from about 25° C. to about 150° C., more preferably in the range from about 25° C. to about 13° C.

In this polyurethane elastomer-forming step, it may be advantageous to add additional compounds which will also react with the isocyanate groups. These additional compounds may include polyether polyols, polyester polyols, and other conventional compounds known to react with polyisocyanates to form polyurethanes.

The carboxylic acid salt-containing polyurethane elastomers of the present invention may be employed as vehicle structural parts, furniture parts, sports equipment and the like.

The following examples are given to further illustrate the present invention. All parts and percentages are by weight unless otherwise explicitly noted.

EXAMPLE 1

Preparation of Carboxylic Acid-Containing Polyether Polyol Addition Product with Fumaric Acid A 3-neck flask was charged with fumaric acid (140 grams) and a polyether polyol [1] (3500 grams). The mixture was heated to 105° C. under nitrogen while stirring. A free radical initiator, 2,5-dimethyl-2,5-bis(2-ethyl hexanoyl peroxy) hexane was added in 3 gram portions every 1.5 hours. After 13 hours and a total of 27 grams of initiator added, the fumaric acid was completely reacted.

The amber liquid product was cooled to room temperature and used to make various metal salts (see Examples 2, 3 and 4 below) without any purification. An IR analysis of this carboxylic acid-containing polyether polyol showed no fumaric acid double bond at 1650 $cm^{-1}$, indicating that the fumaric acid had been completely reacted.

[1] POLY-G ®85-29-2 made by Olin Corporation of Stamford, Conn. This polyether polyol is a triol having an average molecular weight of 6400 and is made by block reacting propylene oxide first and then ethylene oxide (EO:PO mole ratio 15:85) to glycerin initiator.

EXAMPLE 2

Preparation of Calcium Salt

A 3-neck flask was charged with the carboxylated polyol from Example 1 (2,000 grams), CaO (36.7 grams), and water (100 grams). The mixture was heated to 90° C. while stirring. After three hours, the conversion of the acid to the calcium salt was complete as measured by IR analysis. The water was removed in vacuo to yield a liquid product.

EXAMPLE 3

Preparation of Magnesium Salt

A 3-neck flask was charged with the carboxylated polyol from Example 1 (2,000 grams), MgO (24 grams), and water (100 grams). After three hours at 90° C., the conversion of the acid to the Mg salt was complete as measured by IR analysis. The water was removed in vacuo.

EXAMPLE 4

Preparation of Zinc Salt

A 3-neck flask was charged with the carboxylated polyol from Example 1 (2,000 grams), ZnO (53.3 grams), and water (100 grams). After three hours at 90° C., the reaction was complete as measured by IR analysis. The water was removed in vacuo.

EXAMPLE 5

Preparation of RIM Castings

The polyether polyol used in Example 1 (172 grams), ethylene glycol chain extender (28 grams), organomercury catalyst[2] (1 gram), silicon degassing agent[3] (2 drops), and polymeric isocyanate[4] (147.3 grams)—in that order—were weighed into a large beaker. The contents were stirred for one minute, degassed in vacuo, and poured into a ⅛"×6"×6" mold, heated to 135° C. After curing for 24 hours at 135° C., the solid products were removed from the mold and submitted for physical testing. The results are shown in Table I.

[2] Cocure 44—sold by Cosan Chemical Corp., 400 14th Street, Carlstadt, N.J. 07072
[3] SF-1080—sold by GE Silicone Products Department Waterford, N.Y. 12188
[4] Isonate 143L—polymeric MDI sold by UpJohn Corporation, Polymer Chemicals Division, LaPorte, Tex.

EXAMPLES 6–9

The procedure of Example 5 was repeated except that the polyol type, ethylene glycol weight, and isocyanate weight were varied. The results are shown in Table 1.

These results indicate that by using these ionomers, hardness and flexural modulus increased, as compared to Ex. 5, without the use of additional amounts of ethylene glycol and isocyanate. This means that by using less chain extender and isocyanate, the cost of producing an article with these increased properties is reduced. Examples 8 and 9 differ from Examples 5 and 6 by having different relative amounts of ingredients. Examples 8 and 9 make a relatively harder and stronger casting.

TABLE I

RIM CASTINGS

| Example No. | Polyol Name | Polyol Wt. | EG Wt. | Mercury Catalyst Wt. | Polymeric Isocyanate (wt) | Hardness Shore D [5] | Flex Modulus [6] −20° F. | Flex Modulus [6] 73° F. | Flex Modulus [6] 158° F. | Elongation [7] % |
|---|---|---|---|---|---|---|---|---|---|---|
| 5 | 85-29-2 | 172 g. | 28 g. | 1 g. | 147.3 g. | 46 | 38,511 | 19,783 | 14,196 | 240 |
| 6 | Ex. 2 | 172 | 28 | 1 | 146.7 | 55 | 42,472 | 22,331 | 16,203 | 200 |
| 7 | Ex. 3 | 172 | 28 | 1 | 146.7 | 56 | 52,412 | 28,351 | 20,460 | n.m. [A] |
| 8 | 85-29-2 | 129.5 | 36.6 | 1 | 183.8 | 58 | 104,055 | 67,556 | 47,788 | 61.67 |
| 9 | Ex. 2 | 129.5 | 36.6 | 0.75 | 183.4 | 72 | 143,520 | 92,183 | 65,856 | 48.33 |

[5] measured according to ASTM D 2240-75
[6] measured according to ASTM D 790-80
[7] measured according to ASTM D 412-80
[A] not measured

EXAMPLE 10

Preparation of TDI Castings

The polyether used in Example 1 (150 grams), mercury catalyst[2] (1.1 grams), silicone degassing agent[3] (2 drops), and 2,4- and 2,6-toluenediamine diisocyanate (TDI) (6.6 grams) were added—in that order—to a large beaker. The contents were stirred for one minute, degassed, and then poured in ⅛"×6"×6" molds. After curing for 24 hours at 85° C., the solid samples were removed and submitted for physical testing. The results are shown in Table II.

[2] Cocure 44—sold by Cosan Chemical Corp., 400 14th Street, Carlstadt, N.J. 07072
[3] SF-1080—sold by GE Silicone Products Department, Waterford, N.Y. 12188

EXAMPLES 11–13

The procedure of Example 10 was repeated except that the polyol type and the weights of each component were varied. The results are shown in Table II.

These results indicate that by using these ionomers, hardness and tensile strength increased and elongation remained essentially the same, as compared to Ex. 10, without the use of a chain extender and additional isocyanate.

TABLE II

TDI CASTINGS

| Example No | Polyol Name | Polyol Wt. | Mercury Catalyst Wt. | TDI Wt. | Hardness Shore A [5] | Tensile [8] Strength | Elongation [7] % |
|---|---|---|---|---|---|---|---|
| 10 | 85-29-2 | 150 | 1.1 | 6.6 | 34 | 107 | 172 |
| 11 | Ex. 2 | 75 | 0.4 | 3.2 | 49 | 267 | 188 |
| 12 | Ex. 3 | 75 | 0.4 | 3.2 | 48 | 264 | 192 |
| 13 | Ex. 4 | 75 | 0.3 | 3.2 | 39 | 228 | 236 |

[5] measured according to ASTM D 2240-75
[7] measured according to ASTM D 412-80
[8] measured according to ASTM D 412-80

What is claimed is:

1. A process for making a metal salt of carboxylic acid-containing monoether and polyether polyol addition products comprising the step of:

(a) reacting at least one polyhydroxy-containing monoether or polyether compound with an ethylenically unsaturated dicarboxylic acid selected from the group consisting of maleic acid and fumaric acid, and mixtures thereof in the presence of a peroxy-type free-radical initiator, said weight ratio of said polyhydroxy containing monoether or polyether compound to said acid to being from about 99:1 to about 70:30; and (b) neutralizing the formed addition product with a sufficient amount of metal ions selected from the group of mono-, di- or trivalent metal ions of Groups 1a, 2a, 8, 1b and 2b of the Periodic Table to convert at least about 10% of the carboxylic acid groups in said addition product to salt groups.

2. The process of claim 1 wherein said polyhydroxy-containing monoether or polyether compound is selected from the group consisting of polyoxyethylene diols, polyoxyethylene triols, polyoxypropylene diols, polyoxypropylene triols, block and random polyoxyethylene-polyoxypropylene diols and triols, and mixtures thereof, and having average molecular weight from about 300 to about 6500 and is reacted with an acid selected from the group consisting of maleic acid and fumaric acid at a temperature from about 80° C. to about 130° C.

3. The process of claim 1 wherein the metal ions are selected from the group consisting of $Na^+$, $K^+$, $Li^+$, $Ag^+$, $Hg^+$, $Cu^+$, $Mg^{+2}$, $Ca^{+2}$, $Ba^{+2}$, $Cu^{+2}$, $Cd^{+2}$, $Hg^{+2}$, $Fe^{+2}$, $Co^{+2}$, $Ni^{+2}$, $Zn^{+2}$, $Pd^{+2}$, $Pt^{+2}$ and $Fe^{+3}$.

4. The process of claim 3 wherein said addition product is neutralized with a sufficient amount of a neutralization agent to convert substantially all of said carboxylic acid groups to salt groups.

5. A metal salt of a carboxylic acid-containing monoether or polyether polyol addition product made according to the process of claim 1.

6. A metal salt of a carboxylic acid-containing monoether or polyether polyol addition product made according to the process of claim 4.

7. A process for making a carboxylic acid salt-containing polyurethane elastomer comprising the steps of:
(a) reacting at least one polyhydroxy-containing monoether or polyether compound with an ethylenically unsaturated dicarboxylic acid selected from the group consisting of maleic acid and fumaric acid and mixtures thereof, in the presence of a peroxy-type free-radical initiator to form a carboxylic acid-containing monoether or polyether polyol addition product; said weight ratio of said monoether or polyether compound to said acid being from about 99:1 to about 70:30;

(b) neutralizing the formed addition product with a sufficient amount of metal ions selected from the group of mono-, di- or trivalent metal ions of Groups 1a, 2a, 8, 1b and 2b of the Periodic Table to convert at least about 10% of the carboxylic acid groups in said addition product to salt groups; and (c) reacting said neutralized carboxylic acid-containing monether or polyether polyol with an organic polyisocyanate to form said carboxylic acid salt-containing polyurethane elastomer.

8. The process of claim 7 wherein said organic polyisocyanate is at least one aromatic, cycloaliphatic and aliphatic diisocyanate.

9. The process of claim 7 wherein the molar ratio of NCO to OH groups is from about 0.9:1 to about 1.2:1.

10. A carboxylic acid salt-containing polyurethane elastomer made according to the process of claim 7.

11. The process of claim 1 wherein said polyhydroxy-containing monether or polyether compound is reacted to said ethylenically unsaturated dicarboxylic acid at a temperature from about 25° to about 150° C.

12. The process of claim 1 wherein said polyhydroxy-containing monether or polyether compound is selected from the group consisting of polyoxyethylene diols and triols, polyoxypropylene diols and triols, block and random polyoxyethyene-polyoxypropylene diols and triols and mixtures thereof, having a molecular weight from about 300 to about 6500.

13. The process of claim 7 wherein said polyhydroxy-containing monoether or polyether compound is reacted to said ethylenically unsaturated dicarboxylic acid at a temperature from about 25° C. to about 150° C.

14. The process of claim 7 wherein said polyhydroxy-containing monoether or polyether compound is selected from the group consisting of polyoxyethylene diols and triols, polyoxypropylene diols and triols, block and random polyoxyethylene-polyoxypropylene diols and triols and mixtures thereof, having a molecular weight from about 300 to about 6500.

* * * * *

UNITED STATES PATENT AND TRADEMARK OFFICE
CERTIFICATE OF CORRECTION

PATENT NO. : 4,590,255
DATED : 5-20-86
INVENTOR(S) : O'Connor et al

It is certified that error appears in the above-identified patent and that said Letters Patent is hereby corrected as shown below:

In column 7, at line 54 delete "2,4-diisocyanatodiphenyl" and insert --2,4'-diisocyanatodiphenyl--.

In column 8, at line 22 delete "13°" and insert --130°--.

In column 10, at line 29 after "polyether" and before "used" insert --polyol--.

In column 12, at line 29 delete "monether" and insert --monoether--.

Signed and Sealed this

Nineteenth Day of August 1986

[SEAL]

Attest:

DONALD J. QUIGG

Attesting Officer

Commissioner of Patents and Trademarks